(12) United States Patent
Wang et al.

(10) Patent No.: US 6,879,449 B2
(45) Date of Patent: Apr. 12, 2005

(54) BROADBAND REFRACTIVE OBJECTIVE FOR SMALL SPOT OPTICAL METROLOGY

(75) Inventors: David Y. Wang, Fremont, CA (US); David M. Aikens, Chester, CT (US)

(73) Assignee: Therma-Wave, Inc., Fremont, CA (US)

( * ) Notice: Subject to any disclaimer, the term of this patent is extended or adjusted under 35 U.S.C. 154(b) by 0 days.

(21) Appl. No.: 10/429,268

(22) Filed: May 2, 2003

(65) Prior Publication Data

US 2003/0214730 A1 Nov. 20, 2003

Related U.S. Application Data

(63) Continuation of application No. 10/222,296, filed on Aug. 16, 2002, now Pat. No. 6,587,282.
(60) Provisional application No. 60/330,255, filed on Oct. 15, 2001, and provisional application No. 60/316,191, filed on Aug. 30, 2001.

(51) Int. Cl.[7] .............................. G02B 9/12; G02B 9/14; G02B 9/04
(52) U.S. Cl. ..................... 359/785; 359/784; 359/793
(58) Field of Search .................. 359/784, 785, 359/789, 790, 793; 356/327

(56) References Cited

U.S. PATENT DOCUMENTS

| | | | |
|---|---|---|---|
| 3,486,805 A | 12/1969 | Kobayashi | 359/785 |
| 5,121,255 A | 6/1992 | Hayashi | 359/656 |
| 5,608,526 A | 3/1997 | Piwonka-Corle et al. | 356/369 |
| 5,798,876 A | 8/1998 | Nagano | 359/819 |
| 5,917,594 A | 6/1999 | Norton | 356/327 |
| 6,069,751 A | 5/2000 | Saito | 359/785 |
| 6,101,035 A | 8/2000 | Maruyama | 359/785 |
| 6,278,519 B1 | 8/2001 | Rosencwaig et al. | 356/369 |
| 6,323,946 B1 | 11/2001 | Norton | 356/327 |
| 6,549,282 B1 | 4/2003 | Johs et al. | 356/369 |
| 6,587,282 B1 * | 7/2003 | Wang et al. | 359/797 |
| 2002/0024669 A1 | 2/2002 | Danner et al. | 356/369 |

OTHER PUBLICATIONS

U.S. Appl. No. 09/848,733, filed May 3, 2001, entitled "Small Spot Spectroscopic Ellipsometer with Refractive Focusing," pp. 1–15, w/2 sheets of informal drawings.
M.E. El–Ghazzawi et al., "Spectroellipsometry characterization of directly bonded silicon–on–insulator structures," *Thin Solid Films*, vol. 233 (1993), pp. 218–222.

* cited by examiner

*Primary Examiner*—David N. Spector
(74) *Attorney, Agent, or Firm*—Stallman & Pollock LLP

(57) ABSTRACT

The subject invention relates to broadband optical metrology tools for performing measurements of patterned thin films on semiconductor integrated circuits. Particularly a family of optical designs for broadband, multi-wavelength, DUV-IR (185<λ<900 nm) all-refractive optical systems. The designs have net focusing power and this is achieved by combining at least one positively powered optical element with one negatively powered optical element. The designs have small spot-size over the wavelength range spanning 185–900 nm with substantially reduced spherical aberration, axial color, sphero-chromatism and zonal spherical aberration. The refractive optical systems are broadly applicable to a large class of broadband optical wafer metrology tools including spectrophotometers, spectroscopic reflectometers, spectroscopic ellipsometers and spectroscopic scatterometers.

5 Claims, 3 Drawing Sheets

BROADBAND REFRACTIVE OBJECTIVE FOR SMALL SPOT OPTICAL METROLOGY

PRIORITY CLAIM

This application is a continuation of U.S. application Ser. No. 10/222,296, filed Aug. 16, 2002 now U.S. Pat. No. 6,587,250, which also claims priority to U.S. Provisional Patent Application Nos. 60/316,191, filed Aug. 30, 2001, and 60/330,255, filed Oct. 15, 2001.

TECHNICAL FIELD

The subject invention relates to the field of optical metrology, particularly broadband optical metrology tools for performing measurements of patterned thin films on semiconductor integrated circuits.

BACKGROUND OF THE INVENTION

A number of metrology tools are now available for performing optical measurements on semiconductors. Such tools can include spectrophotometers, spectroscopic reflectometers, spectroscopic ellipsometers and spectroscopic scatterometers. Examples of such tools can be found in U.S. Pat. Nos. 5,608,526 and 6,278,519, both incorporated by reference. Such tools typically include a broadband light source for generating a probe beam that is directed to reflect off the sample. Changes in intensity or polarization state of the beam as a function of wavelength are monitored to yield information about the sample Given the continuing shrinking feature size of semiconductor circuits, it is desirable to design the illumination system to provide a tightly focused probe beam to form a small spot on the sample surface. For patterned samples, such as integrated circuits, the metrology instrument must measure within small test features [i.e. often less than 50 microns wide] surrounded by a completely different material or film stack.

Several focusing assemblies have been developed for this purpose. These focusing assemblies can be formed from refractive or reflective elements or a combination of each (cadiatropic assemblies).

It is a common practice to use reflective objective designs in broadband, DUV to IR optical systems. Reflective designs are attractive since they have no chromatic aberration; however off-axis aberrations limit the field of view. Furthermore, reflective optics are more sensitive to manufacturing and alignment errors and, the polarization changes that occur upon reflection from the optical surfaces can become a source of measurement error in ellipsometric applications.

In the prior art, rotationally symmetric reflective objective designs [e.g. the Schwarzchild microscope] are common. This design contains a central obscuration that blocks the light near zero numerical aperture and increases diffractive effects, limiting the size of the focal spot. Prior art, off-axis reflective objective designs may avoid the central obscuration problem of the rotationally symmetric objective. However, the only cost effective method for fabricating off-axis optical elements is diamond turning.

Diamond turned optical surfaces contain grooves and ridges covering a broad range of spatial frequencies. Each spatial frequency component diffracts light at a characteristic angle increasing the stray light outside the desired small spot on the sample. This characteristic error produced by diamond turning is one of the main factors limiting the spatial dimension over which accurate optical metrology measurements of a sample can be made.

Off-axis mirrors made with conventional polishing [e.g. the technique used to make some large astronomical telescopes] would have less scatter and therefore perform better; however the process is very expensive. Replicated optics, characteristically molded in epoxy using a precision form, can be made cost-effectively; however, the performance and durability of these mirrors in optical metrology applications remain unproven.

It is another common practice in the prior art to employ catadioptric designs that incorporate off-axis spherical mirrors and refractive optical elements [e.g. U.S. Pat. No. 6,323,946]. Off-axis spherical mirror systems can be made with no central obscuration and can be finished by conventional polishing techniques; however, an off-axis spherical mirror can generate significant amounts of geometrical aberrations which enlarge the resultant focal spot. Mitigation requires the addition of auxiliary optics possessing equally large aberrations of opposite sign. This design form is highly stressed and is sensitive to manufacturing and alignment errors.

Refractive designs avoid the problems of reflective and catadioptric systems. However, because the refractive index of virtually all materials is wavelength dependent, refractive lenses exhibit chromatic aberration. It is difficult to develop broadband lens designs that are corrected for chromatic aberration over large spectral bandwidths. It is extremely difficult to develop large bandwidth, chromatically corrected designs that meet the requirements of small-spot optical wafer metrology systems.

In the prior art, U.S. Pat. No. 3,486,805 discloses a broadband photographic lens chromatically corrected over the wavelength range spanning 200 to 800 nm. The lens contains three elements: the first and third elements are positive lenses made of fluorite, the second element is a negative lens made from fused silica. However, the design is not appropriate for small-spot optical metrology where axial spot size over all wavelengths must be carefully controlled. The lens is optimized for photographic applications and cannot be scaled to the NA (~0.1) and focal length (~5 cm) appropriate to optical metrology without severe clipping of the beam.

U.S. Pat. No. 5,121,255 discloses a UV transmissive microscope objective. The objective contains a first lens group that includes a meniscus lens, made of quartz or fluorite, with positive power and a second lens group including a biconcave lens made of quartz and a biconvex lens made of fluorite. The second group also has positive power. The microscope objective is designed to produce small-spot illumination; however, since both first and second lens groups have positive power the chromatic aberration of the objective is difficult to minimize. Consequently, the objective is not suitable for small-spot, broadband wafer metrology applications. Further, these designs are unable to achieve the balance of axial spot over all wavelengths without an unacceptable level of sensitivity to misalignment or fabrication errors, or without adding more elements, which make them both more expensive, and also more prone to birefringence problems, which make them inappropriate for ellipsometric applications.

None of the prior art reflective, catadioptric and refractive designs are entirely satisfactory. It would therefore be desirable to develop a design for a high performance, broadband, refractive objective that is chromatically corrected over the wavelength range spanning 185–900 nm.

The assignee's initial efforts to develop a refractive design are described in copending application Ser. No. 09/848,733, filed May 3, 2001 and incorporated herein by reference. The refractive design described in the pending application was able to create a relatively small spot size on the sample, specifically, about 1.5 mm in diameter. While this design improved upon prior designs, further improvements are necessary in order to be able to focus into box sizes of 50 microns or less. The lens design described herein achieves this goal.

SUMMARY OF THE INVENTION

The subject of this invention is a family of refractive optical lens designs for focusing broadband light. The lens consists of three elements made from at least two different optical materials arranged in two groups. The first group includes a positive lens and a negative lens (in the preferred embodiment these lenses are made from different optical materials) with net negative power. The second group consists of a single bi-convex lens (in the preferred embodiment this lens is made from the same material as the positive lens in the first group). The lens elements are specified according to a prescription where the lens faces are consecutively designated from the front to the rear as the first to the sixth face, where $r_n$ is the radius of curvature of the $n^{th}$ face and $t_n$ is the distance between the $n^{th}$ and $(n+1)^{st}$ face. The elements of the lens system are arranged in a configuration where r2<F and the combined focusing power of the first lens group (first and second lenses) is negative. In addition, the spacing t4 between the first and second group of lenses is greater than 0.05F. This arrangement is optimized to produce a chromatically corrected focal spot with a focal spot diameter of less than about 50 microns over the wavelength region spanning 185 to 900 nm.

This family of optical designs is broadly applicable to a large class of broadband optical instruments commonly utilized in wafer metrology employing, spectrophotometry, spectroscopic reflectometry, spectroscopic ellipsometry and spectroscopic scatterometry techniques. The lenses systems can be used to focus light on a sample or to collect light from a sample (or both).

DETAILED DESCRIPTION OF THE PREFERRED EMBODIMENTS

Figure 1:
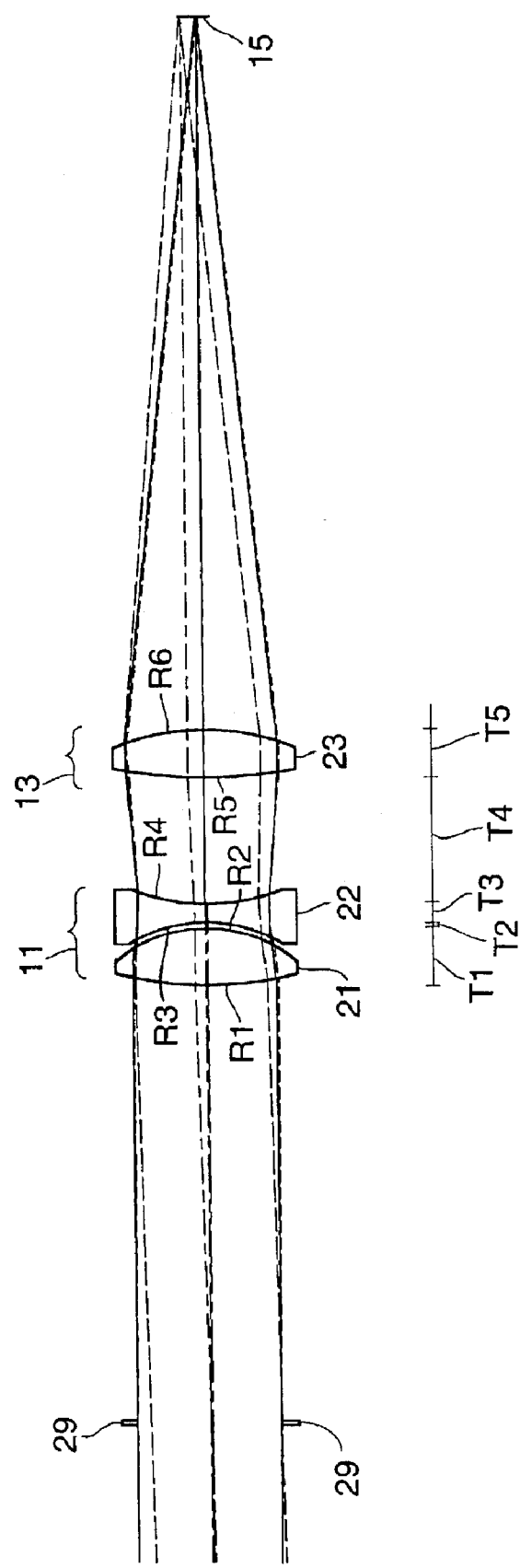
FIG. 1 is a schematic diagram of a preferred embodiment of the refractive objective of the present invention.

FIG. 1 illustrates a preferred embodiment of the refractive optical system 10 of the present invention. Refractive optical system 10 is especially well suited for use in multi-wavelength, DUV to IR applications. The optimized system corrects monochromatic (Seidel) aberrations and axial chromatic aberration, as well as chromatic variations of the monochromatic aberrations, over a wavelength range of 185 nm to 900 nm. The design wavelength range includes 193 nm ArF excimer laser line, 248 nm KrF excimer laser line, as well as a wide assortment of other laser and arc lamp emission wavelengths. However, if desired, the system can be readily adapted to provide chromatic-aberration-corrected imaging over narrower wavelength ranges.

Refractive optical system 10 is comprised of a negative lens group 11, followed by a positive lens group 13 that focuses the light to a final image 15. In the illustrated preferred embodiment, negative lens group 11 is a weak, negatively powered air-spaced doublet, comprised of two lens elements 21 and 22 that are in close proximity, i.e., separated by only a comparatively small distance (t2). In one preferred embodiment element 21 is a $CaF_2$ positive lens and element 22 is a fused silica negative lens. Doublet 11 adds over-corrected third order spherical aberration, astigmatism, and axial color to the optical system; it also corrects chromatic variation of monochromatic image aberrations.

In the preferred embodiment illustrated in FIG. 1, positive lens group 13 has only one element, a single biconvex $CaF_2$ lens 23. The separation t4 between lens groups 11 and 13 [i.e., between elements 22 and 23] is typically at least one-quarter the total combined thickness of the three elements 21, 22 and 23. For example, lens elements 21–23 may span a distance of about 20 mm, and lens element 22 may be 5 to 20 mm from lens element 23. The actual dimensions depend on the scale chosen for the design.

By placing doublet 11 relatively far from the rest of the system components, the shift of the light beam on lenses 21 and 22 with field angle is maximized. That, in turn, helps greatly in achieving the best correction of field aberrations and zonal aberrations. The curvature and positions of the surfaces of lens 23 are selected to minimize monochromatic aberrations and also to cooperate with the doublet 21–22 to minimize chromatic variations of those aberrations.

In the preferred embodiment aperture stop 29 is placed in front of element 21. This is desirable to minimize the optical system's overall length. Vertex length is chosen to correct zonal spherical aberration.

The use of two or more different refractive material types permits control of the primary axial color. Lateral color can also be corrected at the expense of zonal spherical aberration.

The focal powers and spacings of the elements in the first preferred embodiment are set forth below. The lens elements are specified according to a prescription where the lens faces are consecutively designated from the front to the rear as the first to the sixth face, where $r_n$ is the radius of curvature of the $n^{th}$ face and $t_n$ is the distance between the $n^{th}$ and $(n+1)^{st}$ face (see FIG. 1). Thus, r1 would be radius of the front (left) surface of lens 21. T1 is the distance between the front and rear of lens 21. The total focal length F of this embodiment is about 60 mm and the numerical aperture is 0.1.

EXAMPLE 1

| | |
|---|---|
| r1 = 0.481F | t1 = 0.083F |
| r2 = −0.231F | t2 = 0.008F |
| r3 = −0.218F | t3 = 0.025F |
| r4 = 0.314F | t4 = 0.185F |
| r5 = 0.970F | t5 = 0.066F |
| r6 = −0.392F | |

Figure 2:
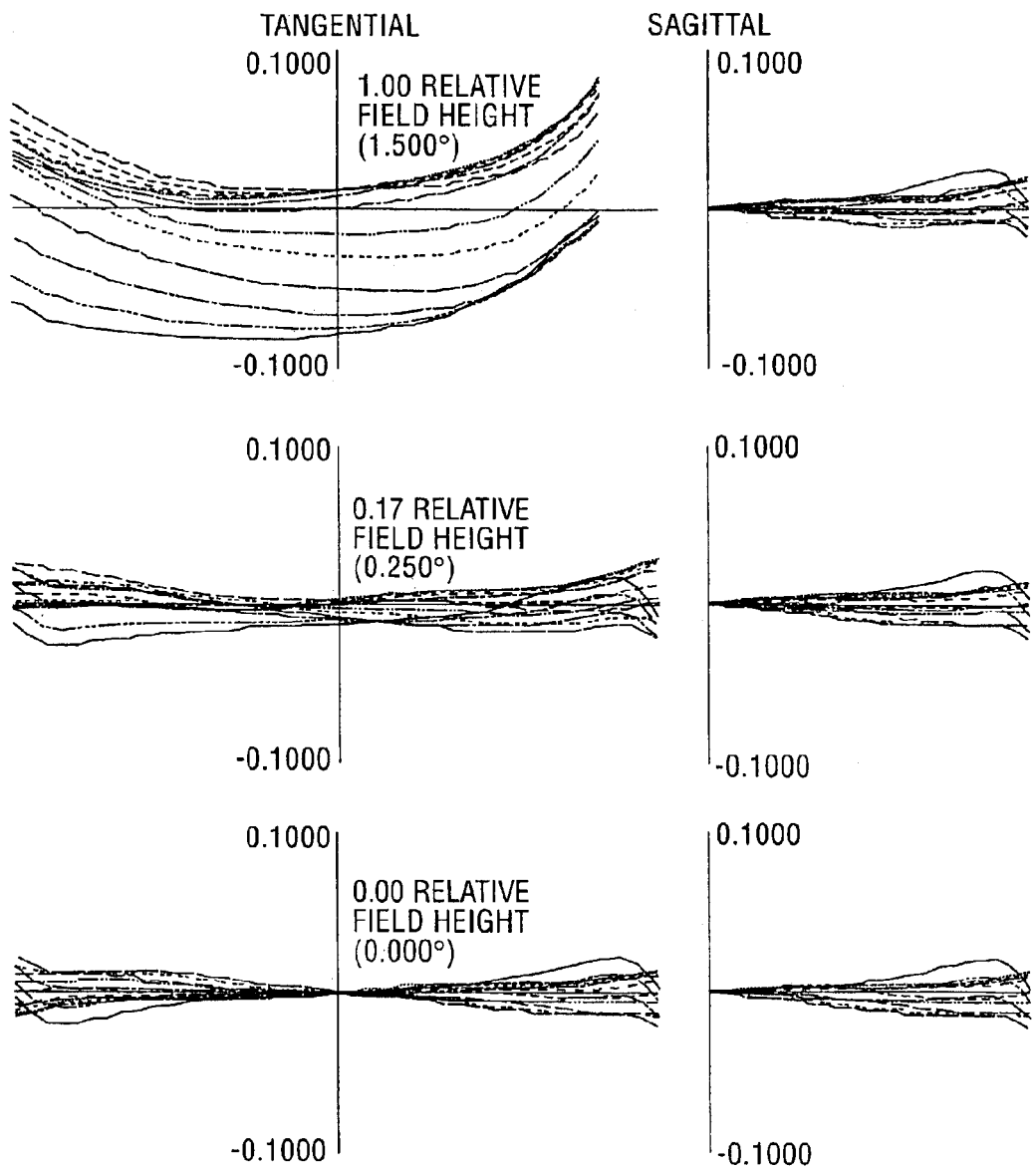
FIG. 2 illustrates the optical aberrations of the refractive objective shown in FIG. 1 at the image plane as a function of numerical aperture.

FIG. 2 shows transverse aberration plots for the preferred embodiment illustrated in FIG. 1. A total of six plots are shown. The plots are grouped in pairs and arranged vertically. For each pair the plot on the left corresponds to y-directed (tangential) ray intercept errors (mm) vs. relative NA, and the plot on the right shows the corresponding x-directed (sagittal) errors (mm) vs. relative NA. Calculations were performed for several discrete wavelengths spanning the spectral region between 185 and 900 nm. The NA varies between 0 and 0.1.

The lower two plots correspond to the on-axis aberrations. The on axis errors are small, significantly less than ±0.03 mm for relative $0 \leq NA \leq 0.1$. Furthermore, the wavelength dependence of the aberrations is weak. In the spectroscopic ellipsometers manufactured by the assignee herein, these on-axis curves correspond to the signal channel (transmitted polarization).

The middle two plots correspond to ray aberrations at 0.25 degrees off-axis. In this case, the aberrations are larger in comparison with the on-axis case (particularly near $NA \approx 0$); however, overall, the wavelength dependence is still quite modest.

The upper plots correspond to 1.5 degrees off-axis. Here significant chromatic aberration is observed (of order 0.1 mm) over the simulated wavelength region (185–900 nm). This corresponds to the rejected polarization in assignee's spectroscopic ellipsometer products.

Consequently, the preferred embodiment of the refractive objective illustrated in FIG. 1 is capable of producing a uniform small (50 microns in diameter) spot illumination of a sample, for $0 \leq NA \leq 0.1$, over the wavelength range between 185 and 900 nm and is applicable to both photometric and ellipsometric metrology.

Alternative preferred embodiments of the refractive objective may utilize several deep UV transparent refractive materials including fused silica, modified fused-silica, sapphire, modified quartz, LiF, $CaF_2$, $BaF_2$, $SrF_2$, $MgF_2$ or mixtures thereof. Note, while amorphous materials are substantially isotropic, the incorporation of very small quantities of micro-crystallites into substantially amorphous materials can render the composite birefringent.

In a second example, we designed an objective lens system with the same overall form but with a focal length of about 55 mm. The specifics of this second embodiment are set forth below with the same naming convention.

EXAMPLE 2

| | |
|---|---|
| r1 = 0.741F | t1 = 0.091F |
| r2 = −0.263F | t2 = 0.015F |
| r3 = −0.247F | t3 = 0.036F |
| r4 = 0.281F | t4 = 0.088F |
| r5 = 0.530F | t5 = 0.082F |
| r6 = −0.366F | |

The refractive objective may be employed as part of the illumination system and/or part of the light collection system in optical metrology applications. In general, the refractive objective may be used as a substitute for any off-axis focusing mirror in collimated space. Consequently, the refractive objective is applicable to the design of the majority of broadband optical metrology tools including spectroscopic reflectometers, spectroscopic ellipsometers, spectroscopic scatterometers and optical CD metrology tools.

When used in an illumination system, the refractive objective is situated between the light source and the sample. In one arrangement, the refractive objective brings the source light to a sharp focus at a desired location for purpose of spatial filtering. In another arrangement, the refractive objective collimates the source beam, for redirection of the source light towards the sample. In another arrangement the refractive objective is used to provide small-spot illumination of the sample.

When employed in a collection system the refractive objective is located between the sample and the detector. In one arrangement, the refractive objective collects the light beam scattered or reflected from the sample and sets the beam at the desired beam size and divergence. In another arrangement the refractive objective collimates the light from the sample.

Figure 3:
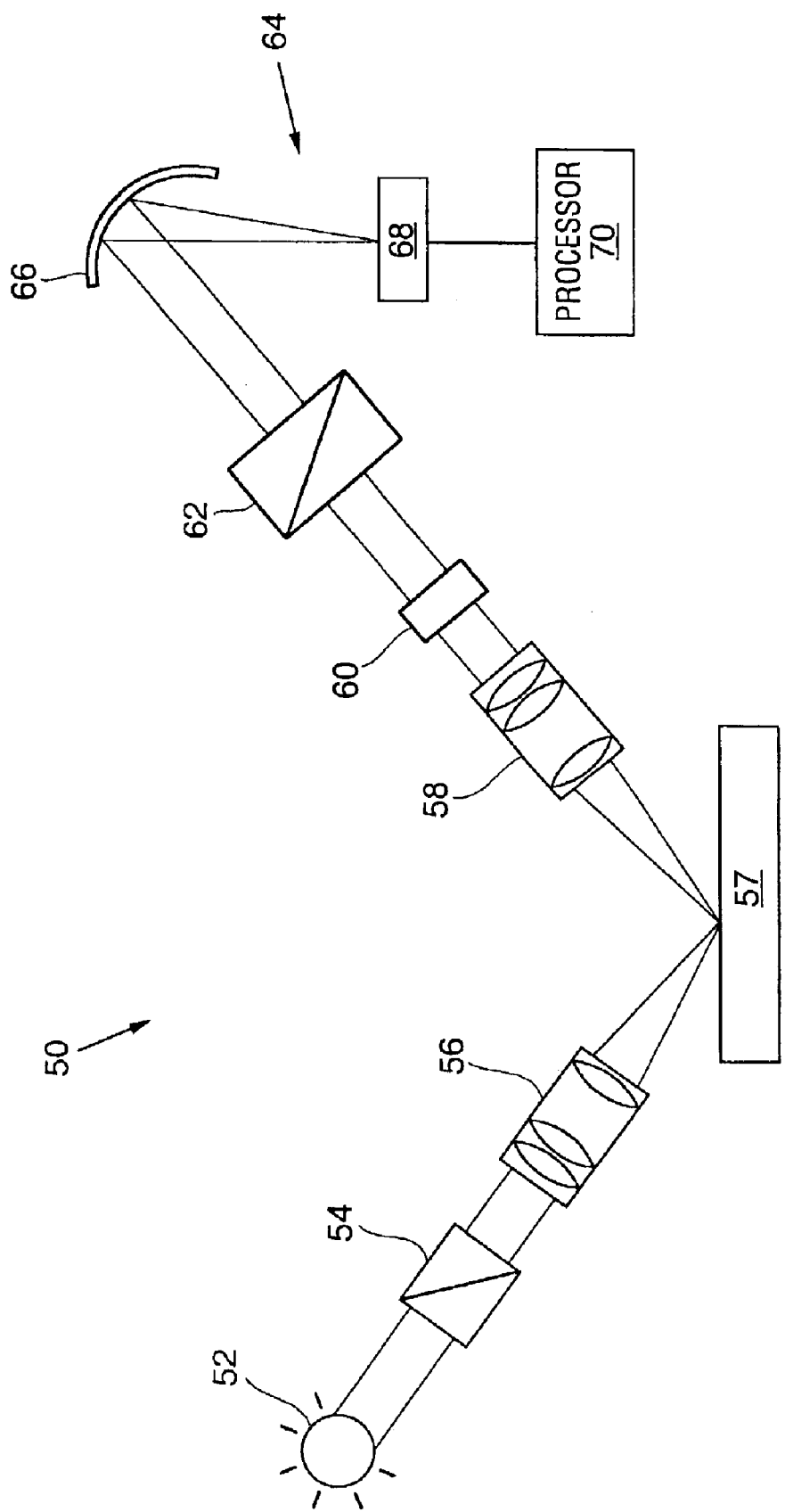
FIG. 3 illustrates an ellipsometer device in which the subject lens system could be used.

FIG. 3 illustrates an example of a spectroscopic ellipsometer 50 in which the subject lens assemblies could be used. As shown therein, the ellipsometer includes a light source 52 for generating a polychromatic beam having both UV and visible wavelengths. This light source can be defined by a single lamp, or by two lamps such as a tungsten halogen for the visible range and a deuterium lamp for the UV wavelengths. The source would typically have a range of at least 500 nm and preferably covers a range from about 185 nm to 900 nm.

Light from the source is directed through a polarizer 54 for establishing a fixed, known polarization of the light. The light is then directed through the subject lens system 56 of the subject invention. The lens system 56 focuses the light on the sample 57.

The light reflected from the sample is collimated by collimator 58. In the illustrated embodiment, collimator 58 is in the form of the subject lens system. After collimation, the light is passed to an analyzer system for determining the change in polarization state of the beam. In the illustrated embodiment, the analyzer system includes a rotating waveplate (compensator) 60, a stationary analyzer (polarizer) 60 and a detector 64. The waveplate is driven by motor (not shown). The detector 64 is a spectrometer which includes an optical element 66 for dispersing the light (i.e. a grating) and a diode array 68 to measure the different wavelengths simultaneously. A processor 76 receives the output signals from the detector.

One skilled in the art will understand that the above ellipsometer arrangement is only exemplary and that the subject lens system could be used in other well known arrangements, such as rotating polarizer ellipsometers, nulling ellipsometers, etc.

The subject lens systems can be used in both off-axis focusing arrangement as well as normal incidence measurements.

In summary, the refractive objective lens has the following properties:

1. The design uses high UV to IR transmission materials, to achieve high throughput, such as fused silica and fluoride glasses.
2. The design uses centered, refractive elements, to minimize manufacturing and alignment sensitivities. Because fused silica and fluoride glass do not differ substantially in dispersion in the deep ultraviolet, the component elements need to have different optical power.
3. The design uses conventionally polished, refractive elements, to achieve low scatter.
4. The design uses low stress birefringence materials, to mitigate polarization issues.
5. The design has no central obscuration.
6. The design uses multi-element, achromatic refractive elements, made from two or more different refractive materials, such as fused silica and fluoride glass. The achromatic lens corrects axial color, over a broad spectral range. The lens separation is adjusted to minimize both field aberrations and zonal spherical aberrations.
7. The design can operate at an angle of incidence range of +/−90 degrees to the sample.

8. The system aperture stop may be located either inside or outside of the lens group depending on the optimization.

9. The design provides a numerical aperture of at least 0.1, a large field size of about 3 mm and substantially flat field axial imaging over wavelength range from 185 nm to 900 nm.

We claim:

1. A spectroscopic ellipsometer comprising:

a light source for generating a polychromatic light beam with both UV and visible wavelengths;

a polarizer for polarizing the light beam;

a refractive objective of focal length F comprising a first positive lens made from a first optical material, a second negative lens made from a second optical material and a third positive lens made from a third optical material, the lens elements are specified according to a prescription where the lens faces are consecutively designated from the front to the rear as the first to the sixth face, where rn is the radius of curvature of the nth face and tn is the distance between the nth and (n+1)st face, the elements are arranged in a configuration where:

r2<F;

t4>0.05F;

the combined focusing power of the first and second lenses is negative and the arrangement is optimized to produce a chromatically corrected focal spot with a focal spot diameter of less than about 50 microns over the wavelength region spanning 185–900 nm;

a collimator for collecting the light reflected form the sample; and a detection system for simultaneously monitoring the reflected light at a plurality of different wavelengths.

2. The spectroscopic ellipsometer of claim 1 wherein r5>0.5F.

3. The spectroscopic ellipsometer of claim 1 wherein r4>2.5F.

4. The spectroscopic ellipsometer of claim 1 where said first and third optical materials are CaF2 and the second optical material is fused silica.

5. The spectroscopic ellipsometer of claim 1 where said first, second and third optical materials are selected from at least two materials within the group consisting of fused silica, modified fused-silica, sapphire, modified quartz, LiF, CaF2, BaF2, SrF2, MgF2 and LaF3.

* * * * *